United States Patent [19]
Jonkka et al.

[11] Patent Number: 5,134,929
[45] Date of Patent: Aug. 4, 1992

[54] METHOD AND EQUIPMENT FOR COMPRESSING MATERIAL CONSISTING OF PARTICLES

[75] Inventors: Arvo Jonkka, Pori; Antti Tohkala, Rauma; Esko Unkuri, Nakkila, all of Finland

[73] Assignee: Rauma-Repola Oy, Pori, Finland

[21] Appl. No.: 583,488

[22] Filed: Sep. 17, 1990

[30] Foreign Application Priority Data

Sep. 18, 1989 [FI] Finland .................................. 894387
Oct. 4, 1989 [FI] Finland .................................. 894708

[51] Int. Cl.⁵ .................................................. B30B 9/02
[52] U.S. Cl. ...................................... 100/37; 100/41; 100/116; 100/144; 100/178; 100/210; 100/236; 100/264; 198/621; 198/750
[58] Field of Search ................... 100/35, 37, 41, 110, 100/113–116, 125, 144, 151, 154, 156, 177, 178, 210, 233, 236, 237, 264, 295; 198/621, 750

[56] References Cited

U.S. PATENT DOCUMENTS

| | | | |
|---|---|---|---|
| 2,107,607 | 2/1938 | Göbel | 198/621 X |
| 2,271,599 | 2/1942 | Mauer | 100/144 |
| 2,278,552 | 4/1942 | Mauer | 198/621 |
| 2,340,607 | 2/1944 | Mauer | 100/144 |
| 3,850,213 | 11/1974 | Keaton | 100/154 |
| 4,492,303 | 1/1985 | Foster | 198/750 |

FOREIGN PATENT DOCUMENTS 78020 9/1984 Finland .

*Primary Examiner*—Harvey C. Hornsby
*Assistant Examiner*—Stephen F. Gerrity
*Attorney, Agent, or Firm*—Burns, Doane, Swecker & Mathis

[57] ABSTRACT

A method and apparatus for removing liquid from particles of compressible material includes feeding particles to two opposing press surfaces that are separated by a distance that decreases along a feeding direction wherein at least one of the press surfaces is formed of a number of parallel transfer elements and wherein each transfer element is connected to a corresponding pressing actuator. The sum of a surface area of each transfer element forms a total press surface area for one of the press surfaces. The transfer elements are reciprocated in a forward and backward motion along the conveying direction such that a total press surface area includes at any particular time a forward moving surface area that is larger than any backward moving surface area.

9 Claims, 3 Drawing Sheets

METHOD AND EQUIPMENT FOR COMPRESSING MATERIAL CONSISTING OF PARTICLES

This invention concerns a method for compressing material consisting of particles so that the material is fed between press surfaces, where the cross-sectional area of the material flow decreases in feeding direction of the material. The invention also concerns a pressing machine for compressing material consisting of particles, which pressing machine comprises opposite press surfaces, the distance of which decreases in direction of motion of the material.

BACKGROUND AND SUMMARY

It is known to use different pressing machines for increasing the dry matter content of bark produced by debarking of trees. The bark is used as fuel, but before that it has to be dehydrated. The dehydration has been effected by different piston and roller presses. Different press constructions have been described such as in Finnish patent publication 78020. A problem with the known roller press solutions is the feeding of the bark to the narrow pressing nip. The actual pressing time of the roller presses is rather short and for this reason the material must be led through the pressing nip several times. As the bark package loosens between the pressing regions, a part of the pressed water returns. One problem has also been the fact that pressing surfaces perforated for the dehydration must endure very big pressing forces. The dehydration has only been possible to be arranged through the pressing surface below the bark.

The method in accordance with the invention is characterized in that at least one of the pressing surfaces is formed by parallel transfer elements, like balks, moving back and forth in transfer direction, a larger part of the total pressing surface of which is moving in the feeding direction at a time than in the return direction, and that the speed of the return motion of the transfer elements is higher than that of the feed motion. The pressing machine in accordance with the invention is characterized in that at least one of the pressing surfaces is formed by parallel transfer elements, like balks, equipped with devices in order to move them back and forth in feeding direction so, that a larger part of their total pressing surface is moving in the feeding direction at a time than in the return direction, and that the speed of the return motion of the transfer elements is higher than that of the feed motion.

The construction of the pressing machine in accordance with the invention is very simple and solid. The pressing time in the pressing machine can be arranged to be long enough. When the material is going through the press, it is constantly pressed tighter and tighter and it is not necessary to let the material package loosen meanwhile. Feeding of the material can be easily effected. The pressing surfaces can be arranged in a way that the material is fed between them from above, whereby it is possible to effect the dehydration through both pressing surfaces. It is not necessary to perforate the transfer elements on the pressing surfaces, because the dehydration can be arranged through the gaps between the transfer elements. Thus, the transfer elements can be made of acid-proof stainless steel, which is not easily usable in perforated surfaces, as it is very difficult to be perforated. The size of the pressing machine can easily be increased by building new transfer elements next to the earlier ones. If every transfer element is equipped with a separate pressing cylinder, the construction is flexible and yields without being broken by f.ex. stones in bark material.

BRIEF DESCRIPTION OF THE DRAWINGS

The invention and its details are described in more detail in the following with reference to the enclosed schematical drawings, wherein.

DESCRIPTION

Figure 1:
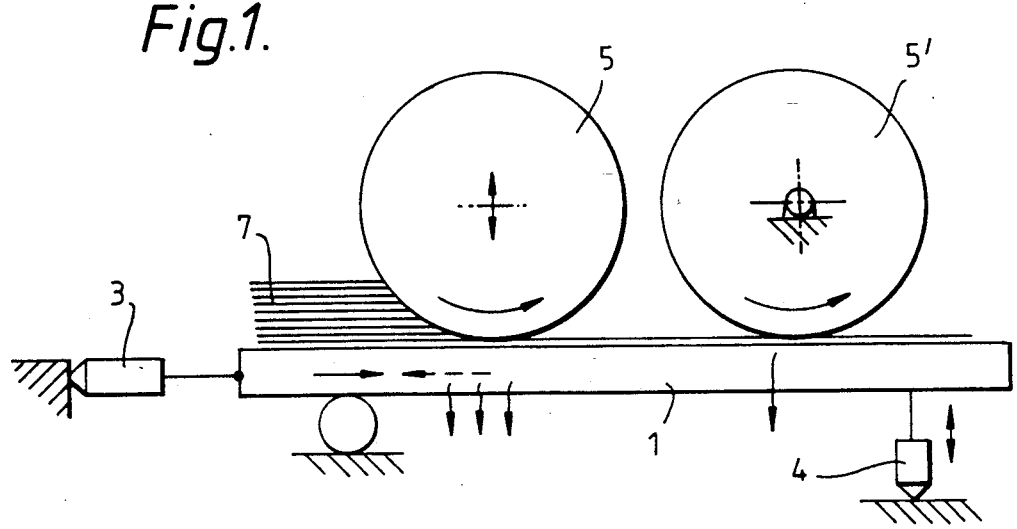
FIG. 1 shows a side view of one application of the pressing machine in accordance with the invention.
Figure 2:
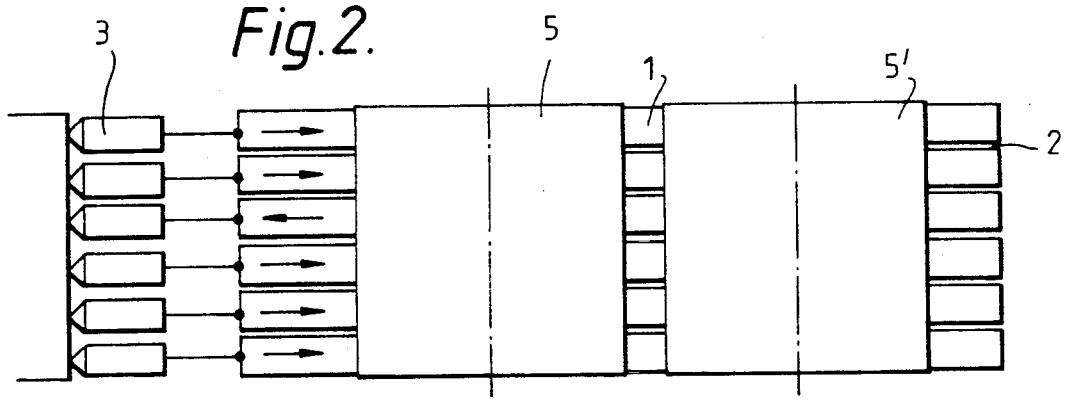
FIG. 2 shows the same viewed from above.
Figure 3:
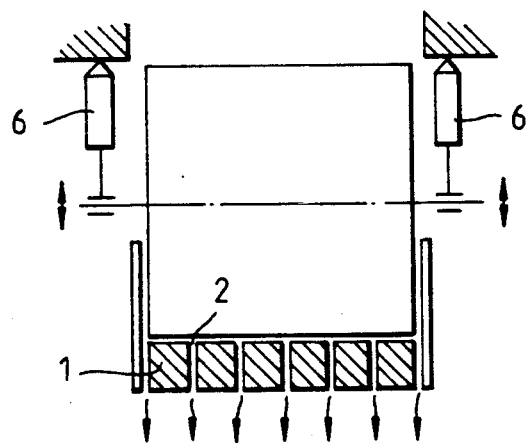
FIG. 3 shows the same viewed from one end.

In the application in accordance with the FIGS. 1-3 the pressing surface is formed by several parallel axial steel balks 1, with gaps 2 between them. The balks are moved back and forth axially for example by hydraulic cylinders 3 fixed in their ends. The speed of the feed motion of the balks 1 (in FIGS. 1 and 2 from left to right) is a fraction of the speed of the return motion. For example, six parallel bars can be used and the return motion can be arranged to be six times faster than the feeding motion. A suitable speed of the feed motion is e.g. 0.1 m/s. Thus, the balks can be synchronized so that one of them at a time is moving backwards when the others are performing the feeding motion forward.

At the end of the pressing machine each balk 1 is equipped with a pressing cylinder 4 that pushes the head of the balk upwards.

Above the balks there are two pressing rolls 5 and 5' one after another, the both of which are pressed downwards towards the balks by the pressing cylinders 6.

The bark material 7 is fed to the pressing nip between the roll 5 and the balks 1, where it, as a carpet, goes forward between the second roll 5'' and the balks 1. The water of the bark material runs off downwards through the gaps 2 between the balks and the dry bark is removed at the end of the machine.

Figure 4:
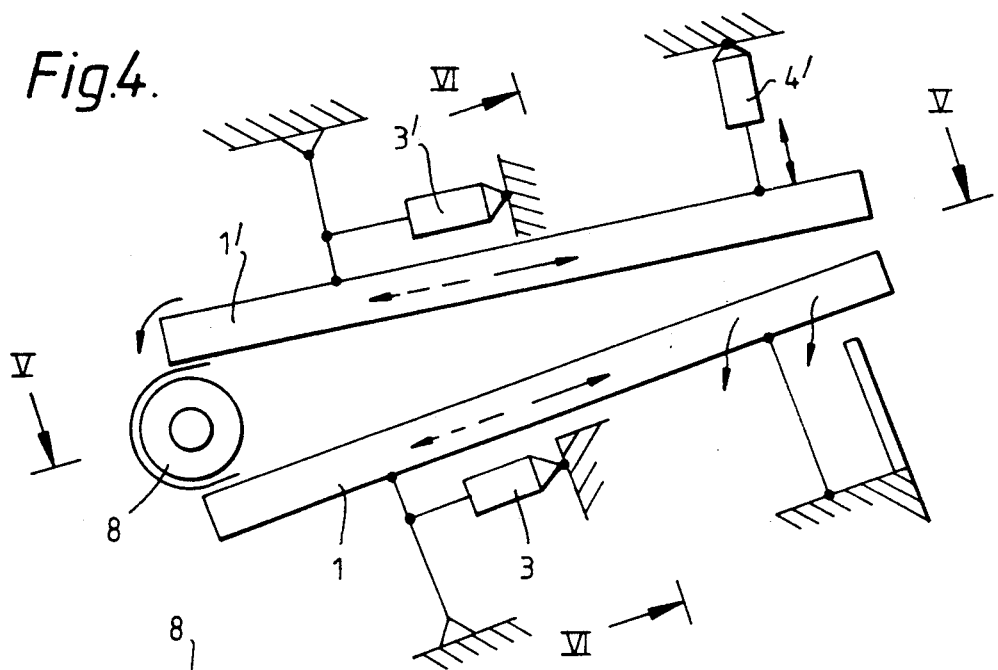
FIG. 4 shows a side view of another application of the pressing machine in accordance with the invention.
Figure 5:
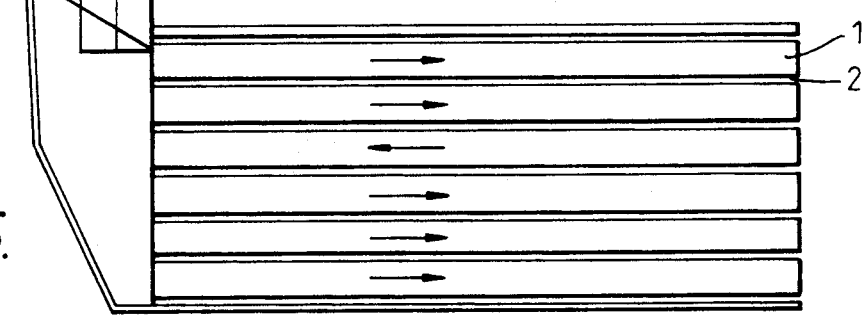
FIG. 5 shows section V—V of FIG. 4.
Figure 6:
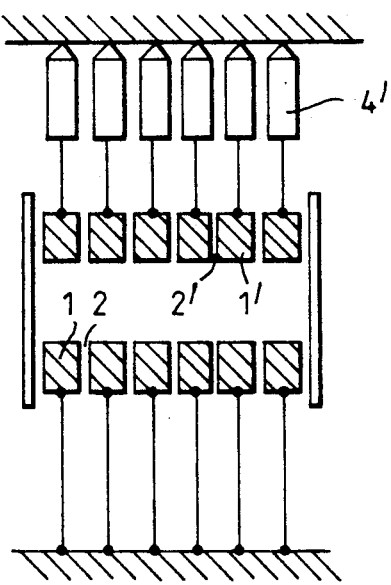
FIG. 6 shows section VI—VI of FIG. 4.

FIGS. 4–6 illustrate an application, whereby the rolls 5 and 5' have been replaced by another pressing surface formed by parallel balks 1'. The back and forth motion of these is effected in the same way as that of the lower balks 1. The distance between the pressing surfaces formed by the balks 1 and 1' is reduced in the feed direction. The axial movement of the balks 1 and 1' back and forth is effected by hydraulic cylinders 3 and 3'. The upper balks are pressed downwards by pressing cylinders 4'.

The bark material is brought to the pressing machine by a conveyer 8 to the front end of the pressing machine, where the balks 1 and 1' move it forward between them (in FIGS. 4 and 5 from left to right). When the distance between the balks is reduced the bark material, when proceeding, is pressed tighter and tighter to a smaller and smaller volume. The pressing effect is continuous and water is extracted all the time through gaps 2 between the lower balks.

Figure 7:
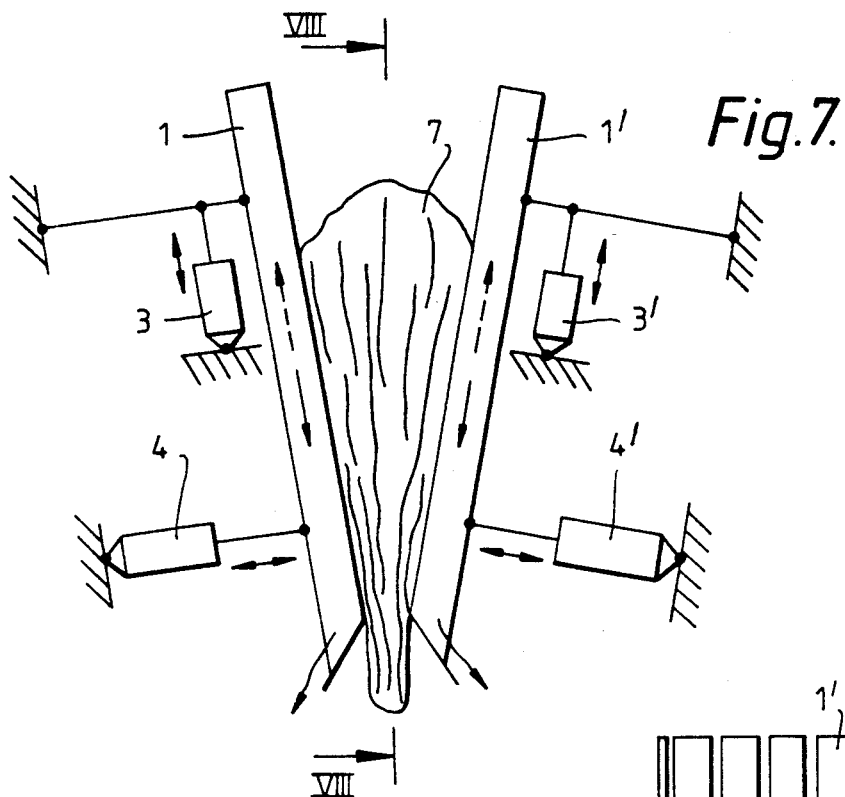
FIG. 7 shows a side view of a third application of the pressing machine in accordance with the invention.
Figure 8:
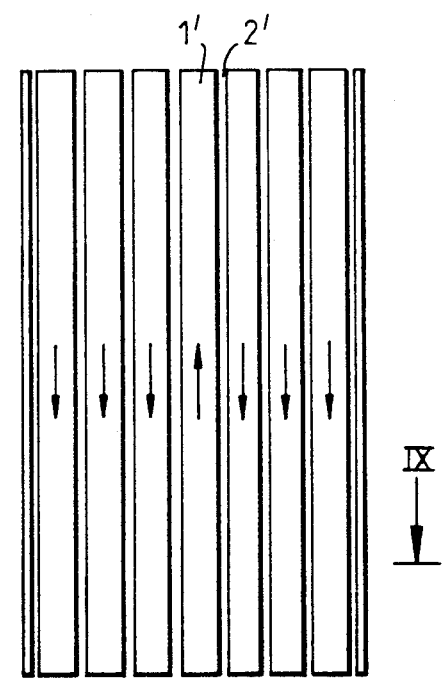
FIG. 8 shows section VIII—VIII of FIG. 7
Figure 9:
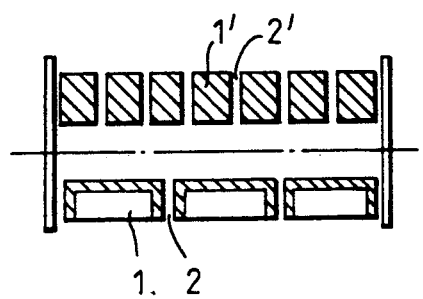
FIG. 9 shows section IX—IX of FIG. 8.

FIGS. 7-9 illustrate a third application of the pressing machine in accordance with the invention. The pressing surfaces formed by the balks 1 and 1' are arranged to be inclined vertically so that their feeding direction is from above downwards and the distance between them is also reduced from above downwards. Each of the balks 1 and 1' of the both pressing surfaces are equipped with their own pressing cylinders 4 or 4' at their tail ends.

The bark material 7 is brought between the pressing surfaces from above, wherefrom it proceeds downwards the distance between the pressing surfaces and the volume of the bark material being constantly reduced. The water is effeciently removed through the gaps 2 and 2' between the balks of the both pressing surfaces.

The invention is not restricted to the application presented above but it can be alternated within the framework of the claims. The pressing machine can be applied, besides to the dehydration of the bark material or any other material, but also to compressing of dry material and reducing of its volume.

If necessary, the balks 1 can also be perforated to extract the liquid. One of the pressing surfaces can be, besides a roll or a device formed by balks moving back and forth, also a solid wall.

The pressure can also be effected by a cylinder pressing all the balks together. By using separate pressing cylinders, anyway, the pressure is flexible and e.g. stones mixed with the bark can pass through without breaking the machine. If necessary the pressure of each pressing cylinder can also be decreased during the return motion.

We claim:

1. A method of removing liquid from compressible material formed of particles comprising the steps of:
    feeding compressible material formed of particles to two opposing press surfaces that are separated by a distance that decreases along a feeding direction, wherein at least one of said press surfaces is formed of a plurality of parallel transfer elements and wherein each transfer element is connected to a corresponding hydraulic cylinder pressing actuator, the sum of a surface area of each transfer element forming a total press surface area for one of said press surfaces;
    variously reciprocating each of said transfer elements in a back and forth motion along a feeding direction such that said compressible material formed of particles is moved along said feeding direction and compressed between said press surfaces so as to remove liquid from said compressible material, said liquid being drained through gap means for draining in at least one of said press surfaces;
    variously reciprocating each of said transfer elements in a back and forth motion along said feeding direction such that at any particular period of time said total press area includes a forward moving surface press area that is larger than any backward moving surface press area; and
    variously reciprocating said transfer elements such that a backward moving speed of the transfer elements is greater than a forward moving speed of the transfer elements.

2. A method for removing liquid from compressible material formed of particles according to claim 1, wherein each of said transfer elements are variously reciprocated by hydraulic reciprocating cylinders.

3. An apparatus for removing liquid from compressible material formed of particles comprising:
    a pair of opposing press surface assemblies, said assemblies being separated by a distance that decreases along a conveying direction in which particles are fed to said assemblies;
    at least one of said press surface assemblies including a plurality of parallel transfer elements and a plurality of individually controllable hydraulic cylinder pressing actuators, wherein each of said plurality of transfer elements is in connection with one of said plurality of hydraulic cylinder pressure actuators, the sum of a surface area for each transfer element forming a total press surface area for said at least one of said assemblies;
    means for individually reciprocating each of said transfer elements in a forward and backward motion along said conveying direction such that said compressible material is urged in said conveying direction and compressed between said press surface assemblies for the removal of liquid, said transfer elements being reciprocated such that said total press surface area includes at any particular time a forward moving surface area that is larger than any backward moving surface area;
    means for controlling reciprocating movement of said transfer elements such that a backward moving speed of said transfer elements is greater than a forward moving speed of said transfer elements; and,
    at least one of said press surface assemblies including gap means for draining said liquid from said compressible material.

4. An apparatus for removing liquid from compressible material formed of particles according to claim 3, further comprising means for actuating each pressing actuator so as to vary a pressure exerted by each transfer element on said particles between said pair of opposing press surface assemblies.

5. An apparatus for removing liquid from compressible material formed of particles according to claim 4, further comprising means for controlling said means for actuating such that said pressure exerted on said particle is decreasable during backward motion of each of said transfer elements.

6. An apparatus for removing liquid from compressible material formed of particles according to claim 5, wherein said gap means for draining liquid comprises spaces formed by separations between said plurality of transfer elements.

7. An apparatus for removing liquid from compressible material formed of particles according to claim 4, wherein said gap means for draining liquid comprises spaces formed by separations between said plurality of transfer elements.

8. An apparatus for removing liquid from compressible material formed of particles according to claim 3, wherein said gap means for draining liquid comprises spaces formed by separations between said plurality of transfer elements.

9. An apparatus for removing liquid from compressible material formed of particles according to claim 3, wherein said means for individually reciprocating each of said transfer elements includes hydraulic reciprocating cylinders.

* * * * *